June 23, 1936.   S. A. STRICKLAND   2,045,420
METHOD OF MAKING ROLLER BEARING CAGES
Original Filed Jan. 14, 1932   3 Sheets-Sheet 1

Inventor
Silas A. Strickland,
Attorneys

June 23, 1936.  S. A. STRICKLAND  2,045,420

METHOD OF MAKING ROLLER BEARING CAGES

Original Filed Jan. 14, 1932  3 Sheets—Sheet 2

Inventor
Silas A. Strickland,
Attorneys

June 23, 1936.   S. A. STRICKLAND   2,045,420
METHOD OF MAKING ROLLER BEARING CAGES
Original Filed Jan. 14, 1932   3 Sheets-Sheet 3

Inventor
Silas A. Strickland,
Attorneys

Patented June 23, 1936

2,045,420

UNITED STATES PATENT OFFICE 2,045,420

METHOD OF MAKING ROLLER BEARING CAGES

Silas A. Strickland, Detroit, Mich.

Original application January 14, 1932, Serial No. 586,547, now Patent No. 1,995,759, dated March 26, 1935. Divided and this application January 4, 1934, Serial No. 705,186

6 Claims. (Cl. 219—10)

This invention relates generally to improvements in the production of roller bearing assemblies, but in some of its characteristics the invention is adapted to be used in connection with the production of assemblies of other types, and in these respects the invention is not specifically so limited. However, the structure is particularly adapted for use in this particular service, and for this reason the explanation of the invention is made on the basis of its use in this particular field, the present application being a division of that filed January 14, 1932, Serial No. 586,547, issued as Patent No. 1,995,759, March 26, 1935.

Roller bearing assemblies generally have the rolls mounted in a cage structure, the rolls and cage structure forming a unit which can be positioned bodily within the inner and outer race members of the assembly. A unit of this type retains the rolls in their positions when the bearing is disassembled, the result being that the complete bearing can be quickly assembled and taken down without liability of loss or misplacement of the rolls. The particular relation of the present invention to such assemblies is found in the production of such unit.

The cage structure of the unit generally involves two annular members spaced apart by a plurality of posts secured to the members to produce a rigid structure, the members generally having openings to receive the spindles of the rolls, the roll diameters being such that the peripheries of the annular members are retained out of contact with the inner and outer race members by the rolls, the latter sustaining the load. In some types the rolls may be tubular and thereby permit the posts to extend through such rolls. In a companion application, filed May 25, 1931, Serial No. 539,839, granted September 12, 1933, No. 1,926,123, I have disclosed an assembly unit of this general type in which the unit includes both solid and tubular rolls, the arrangement permitting of the use of a maximum number of rolls in the assembly, and hence increasing the efficiency of the structure.

In producing such unit assemblies various methods have been employed, the production of the unit involving certain problems which can be understood generally by the fact that the cage structure can be completed only after the rolls are in position, if rapid production is to be had. It is to be understood, of course, that the rolls and the cage structure elements are completed as individual structures, and these are then properly assembled. And while different methods have been employed, it is the practice generally to first form an embryo cage structure, formed of the posts and one of the annular members—generally by riveting the posts to the member—after which the rolls are positioned in the embryo structure, the other annular member then being secured to the free ends of the posts by riveting. Obviously, the assembly could be made prior to post riveting, but in such case it is necessary to positively hold the posts in proper position, a function performed by the annular member when the embryo cage structure method is employed.

As pointed out, such structures generally have the posts riveted to the annular members, and this practically requires that after the assembly of the unit is completed, the assembly must be subject to a final finish grinding of the members in order to eliminate the riveting effects produced on the outer sides of the members.

The present invention is designed to provide a more efficient and substantial unit assembly of this kind, and at the same time reduce the cost of production, this result being obtained by securing the elements of the cage structure together by welding methods, preferably using the electric welding method for the purpose. While such welding methods generally are well-known and have been applied to many uses, their application to this particular field presents a number of difficulties in the form of problems which must be solved before it is possible to utilize such methods at all, although it might be assumed that spot welding might offer suggestions in this respect.

For instance, use of such method practically necessitates the welding of the posts to the annular members as separate operations, thus practically requiring the use of the two-stage production of the unit, thus involving the embryo cage structure method of production. This need will be understood from the fact that the welding operations would be necessary at opposite ends of the posts and hence, at spaced points in the welding current path, thus setting up the necessity of attempting series welding conditions if an attempt were made to complete the unit by a single welding operation. The need of the two-stage welding thus brings in the problems relative to the handling of the various elements. The posts must be positioned accurately relative to the first annular member and with respect to their positions in the complete cage structure, so that it is necessary that the initial location be with accuracy—especially where they are to extend through tubular rolls—as well as in the angular relation to the plane of the member. The posts of the embryo structure must later be welded to the other annular member, and hence the initial positioning, and the maintenance of such positions during welding, must be with accuracy.

Obviously, the welding must be provided without affecting the posts or by welding action such as could affect the operation of any of the rolls of the assembly. The length of the rolls generally approaches the distance between the members, so that the presence of any appreciable bulges or enlargements of the posts or the welds, could affect the roll operation. This brings in problems relating to the welding operation itself, since the weld should not serve to enlarge the ends of the posts, these problems reaching to the characteristics of the opposing surfaces provided by the end of the post and the annular member.

In this latter respect, the invention reaches beyond the specific field being discussed, since such problems would be present wherever it is desired to weld the end of any member having the characteristics of the post of the cage structure—an elongated element of small cross-section—where it is desired that the weld be maintained within the opposing surfaces and leave the exposed surfaces unaffected. To obtain this result it is more or less a requisite that characteristics of spot welding be set up under conditions where the small area of one of the surfaces renders it difficult to produce the spot welding characteristics.

These are a few of the problems which are inherent in any attempt to apply electric welding methods to the production of cage assemblies of this type, aside from the problems bearing on the development of a welding apparatus capable of producing the result, and indicate somewhat why the substitution of welding for riveting as the securing method in producing the cage structure is a difficult substitution.

The present invention is designed to solve these and other problems involved in such substitution, and to provide for the welding of the posts to an annular member concurrently and with rapidity and in such form that finish grinding of the assembly is not required.

To these and other ends, therefore, the nature of which will be readily understood as the invention is hereinafter disclosed, said invention consists in the methods, structures, and construction and combinations of parts hereinafter more fully described, illustrated in the accompanying drawings, and more particularly pointed out in the appended claims.

In the accompanying drawings, in which similar reference characters indicate similar parts in each of the views,—

Figures 8, 9:
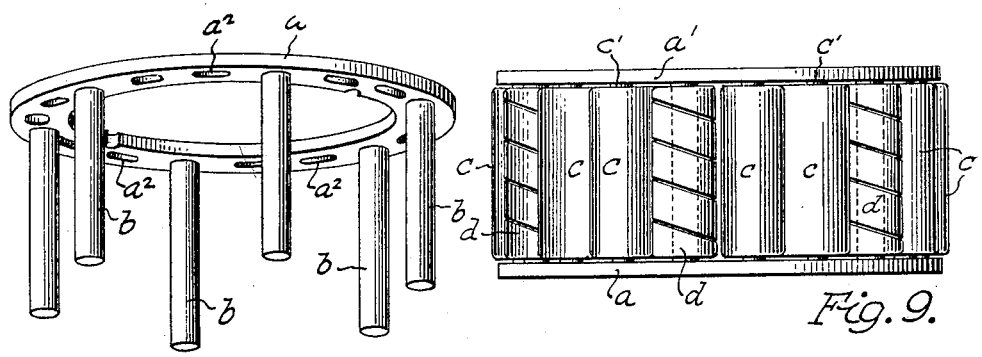
Fig. 8 is a perspective view of the embryo cage structure produced by the first welding operation.
Fig. 9 is a face view of the completed assembly of unit as produced by the second welding operation, the view illustrating a unit of the general type shown in the companion application.

To enable a clearer understanding to be had of the characteristics of the present invention, as well as a clearer understanding of the nature of the problems involved, a brief description is given of the structure which is to be produced, viz.: the roller bearing unit assembly, reference being had more particularly to the showing of Figures 8 and 9.

The assembly is made up of the cage and the rollers carried thereby. The cage is formed of the annular members $a$ and $a'$, the former being considered as the member utilized for the initial welding operation, both members, however, preferably being duplicates. The two members are united by a series of posts $b$, the members and the posts providing the cage formation. Various arrangements of rollers are employed with cages of this type, and the present invention is designed to be utilized in the production of most if not all of these. However, for the purpose of illustration, the form of assembly employed is that substantially disclosed in my companion application heretofore identified, and in continuing the explanation of the assembly, this particular arrangement is utilized, Fig. 9 showing an assembly of the type referred to.

As shown, the roller portion of the assembly is made up of solid rolls $c$ and spiral rolls $d$, the solid rolls having pintles $c'$, while the spiral rolls are tubular. In practice, a pair of solid rolls separates two spiral rolls, the result being that the assembly carries twice as many solid rolls as there are spiral rolls. This arrangement permits the posts $b$ to be utilized as the carriers for the spiral rolls, the latter being mounted on the posts, the posts being spaced equi-distant in the circumferential length of the members $a$ $a'$. To provide for freedom of movement of the solid rolls the members $a$ $a'$ are provided with elongated slots $a^2$ (Figure 7) to receive the pintles $c'$.

By this arrangement a maximum number of rolls may be employed in the assembly. While the greater portion of the load is borne by the solid rolls—these being arranged in pairs—the spiral rolls also do their share of the work, so that the efficiency of the assembly is not affected by the arrangement. The arrangement, however, has a particular advantage in that it permits the solid rolls to have the characteristics of a floating action without, however, permitting the development of dangerous skewing action. The latter is prevented by reason of the fact that the spiral rolls are themselves held from material floating action, due to the fact that the posts $b$ are fixedly positioned, so that the only floating permitted by the spiral rolls is that which may be present through the loose mounting of the spiral rolls on the posts, such play as may be provided being insufficient to permit material skewing of these rolls. Since the spiral rolls can thus be positively held against material skewing, it will be readily seen that the skewing movements of adjacent solid rolls is restrained, although the solid rolls are themselves floatable. Any tendency of a solid roll to materially skew, brings the advance end into contact with a spiral roll, thus setting up conditions which tend to right the solid roll. As a result, the free floating of the solid rolls cannot extend to a condition where dangerous skewing will arise, and, in addition, there is no tendency of a series of rolls being affected, since the action can extend no farther than the rolls intermediate two spiral rolls, so that liability of damage to the assembly from this cause is kept at the minimum.

In the disclosure of the present invention, an assembly of this type is utilized to illustrate the characteristics of the invention. In the companion application for the assembly per se, the manner in which the members and posts are united is immaterial, it being obvious that such uniting may be by the usual riveting methods, if desired. Such structures, however, require to be finish ground after the assembly has been completed, in order that the outer face of the cage members may be without projections. The present invention is designed more particularly for the purpose of uniting the members and posts of the cage by welding operations, both ends of the posts being secured to the members in this way. As a result, all parts may be completed to their final finish state individually and prior to the assembly, the welding operation being designed in such way as to not disturb the assembly parts in such way as to require subsequent finish operations.

To provide this result a number of problems must be solved. For instance, in welding activities it is inherent that the opposing surfaces to be united must become sufficiently soft as to permit the weld amalgamation. With the welding of a small surface such as the end of a post with the large surface of the annular member, any attempt to produce this condition at the end of the post—if the entire end of the post is considered within the zone of the weld—will tend to cause spreading of the post material at the end of the post. Such a result would tend to render the assembly useless because of the fact that such spreading could produce an enlargement such as would prevent the free rotation of the spiral roll about the post. It is a result which would normally follow through the usual welding activities, but is a result which would be detrimental to the production of a serviceable bearing.

Through the course of many experiments, I have found that this difficulty can be overcome and at the same time permit of utilizing welding methods. Two ways of solving this are illustrated in the drawings. Each of these involves the initial limitation of the current path to a very small zone at the end of the post axis. For instance, in Fig. 6, I have shown the cage member as provided with a recess $a^3$ of a diameter equal to or slightly larger than the diameter of the post, and at the center of the depression, I provide a small projection $a^4$, preferably rounded. In this form, the end of the post is flat, and when the assembly is made, the end of the projection contacts the center of the post end. When the current is applied, its effect is made manifest on the projection and the center of the end of the post, and the welding action is rapidly completed, the action being that of a "flash", the spread of the metal of the projection being within the depression and thus confined to the end of the post without causing any post-enlarging action to take place. If there be any spreading, it will be within the member depression, so that the roll space is unaffected.

Figures 6, 7, 10:
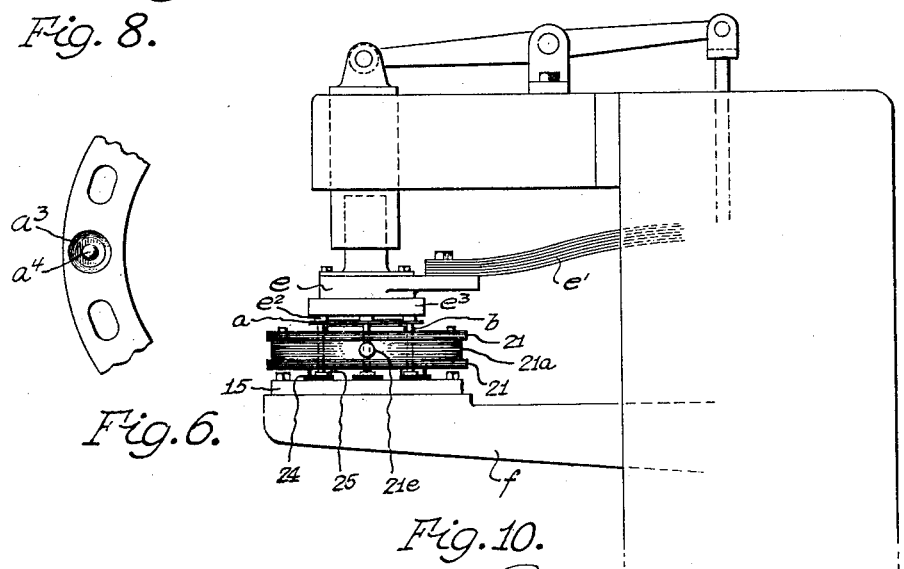
Fig. 6 is a fragmentary view of the welding side of an annular member and showing a preferred configuration for securing an efficient weld.
Fig. 7 is a detail view of a modified form of post and member structure at the welding point, parts being shown in section.
Fig. 10 is an elevation of portions of a welding apparatus with which the carriers are adapted to be employed, one of the carriers being shown in position.

In Figure 7 is shown an alternative method. In this form the depression in the member is omitted and the projection $a^5$ is adapted to enter a complemental recess $b'$ at the post end and in the axis of the post. When the current is applied, the action is made manifest within the zone of the projection, and the flash serves to unite the opposing faces, the weld being limited to such faces, the arrangement being such that the initial contact is only between the projection $a^5$ and the wall of the recess $b'$.

With both forms, the welding action is almost instantaneous, due to the fact that the current path across the line of weld is kept very small in area, so that the actual weld path has characteristics of a spot weld path within the small area at the end of the post, with the affected area of the member confined to the projection.

It is the solution of this problem that makes it possible to utilize welding methods in producing the assembly—a problem that pertains more particularly to the initial structure of the cage members and posts. But additional problems are present, these pertaining to the arrangement of the welding apparatus itself. A few of these will be outlined.

Since the cage structure involves the welding action at both ends of the post, it is clear that these operations must be individual at opposite ends of the post, since uniform welding cannot be done concurrently where the welds to be made have the series characteristic in the current path; it is possible to provide concurrent welding operations by the use of multiple current paths, a fact which is utilized in the present invention, but concurrent welding of a plurality of welds in series does not produce satisfactory results. Hence, the most satisfactory course is to provide for separate welding operations.

The initial operation is that of uniting one end of the posts to the member $a$. As there are a number of posts to be united concurrently, the apparatus must be arranged so as to provide for an accurate location of the posts relative to the ring, so as to locate the welding points properly, and to maintain these relations when the apparatus is set for the application of the current. The posts each form a part of the current path—the latter being in multiple arrangement, with each post providing an individual path. Hence, the apparatus must be arranged to provide this stability of parts and at the same time positively control the current paths. With the application of the current, the welding becomes complete and the embryo product of Figure 8 is produced.

The problems then change for the second welding operation. During this operation, the structure of Figure 8 is a completed assembly and yet the posts must continue to be a part of the current path. But before the current can be applied, it is necessary to assemble the rolls in position, and this includes the location of the spiral rolls $d$ on their respective posts. It is undesirable that the spiral rolls form a part of the current path, and consequently these rolls must be held in such manner as to not affect the current path itself through the posts. And although the solid rolls are not included within the respective paths, the fact that both members $a$ and $a'$ are annular, and the apparatus practically requires that the rolls extend vertically during the operation—thus causing the solid rolls to rest on the member $a$—it can be understood that if the solid rolls should also contact with the positioned member $a'$, additional paths could be provided, a condition which sets up the requirement that the solid rolls not only be insulated from the machine, but also held so as to prevent contact with member $a'$ during the application of the current.

Aside from these conditions, which have their source more particularly because of the nature of the structure to be produced, there are additional apparatus problems set up with a view to obtaining efficient and rapid action of the structure. The apparatus must be such as to enable rapid location of the parts in position and to then bring them into the proper positions for the current application. Without this the capacity of the apparatus is small, and to provide for efficient service, the capacity of the apparatus must be sufficiently large as to render its use profitable.

The drawings illustrate one form in which an apparatus for this service may take, the illustrated form being particularly applicable to meet the particular problems presented in producing a bearing unit assembly of the type disclosed and above described. Obviously, a different form of assembly will require changes in the apparatus, although the required changes will not materially affect the fundamental conditions referred to above. For instance, where the posts do not form the pintles for the spiral or hollow rolls but are separate, the assembly for the second operation still requires the isolation of the position rolls from the member $a'$, since the creation of current paths other than through the posts is to be avoided. Hence, it is to be understood that the apparatus now to be described is more or less illustrative, and is to be considered only as a preferred embodiment designed for a particular type of bearing unit assembly, and as teaching the general solution of the problems to be solved in producing bearing assemblies under welding method activities, the broad invention present being designed to be utilized in connection with bearing assemblies of various types, the necessary changes in the apparatus being considered as included within the broad invention.

The welding apparatus is shown more or less conventionally in Figure 10, being made up of the more or less conventional upper and lower electrodes $e$ and $f$, the former being arranged to be raised and lowered by suitable mechanism. The upper electrode includes the copper conductor $e'$, with the lower portion of the electrode swivelled, as indicated in Figure 2, and having its lower face of an annular form and provided with a series of projecting contacts $e^2$ arranged to correspond to the positions of the several posts $b$ of the assembly, the facial area of the contacts being approximately that of the cross-sectional area of the posts.

The lower electrode $f$ is in the form of an arm which may be of copper, and which also includes an annular face to which the carrier presently described is removably secured. Two different carriers are employed—one for the first welding operation and the other for the second operation, and since, in the second operation, certain additional functions must be met, including the release of certain supporting members, the lower electrode is arranged with a central opening for the passage of a tool to permit of the releasing action.

Figure 2:
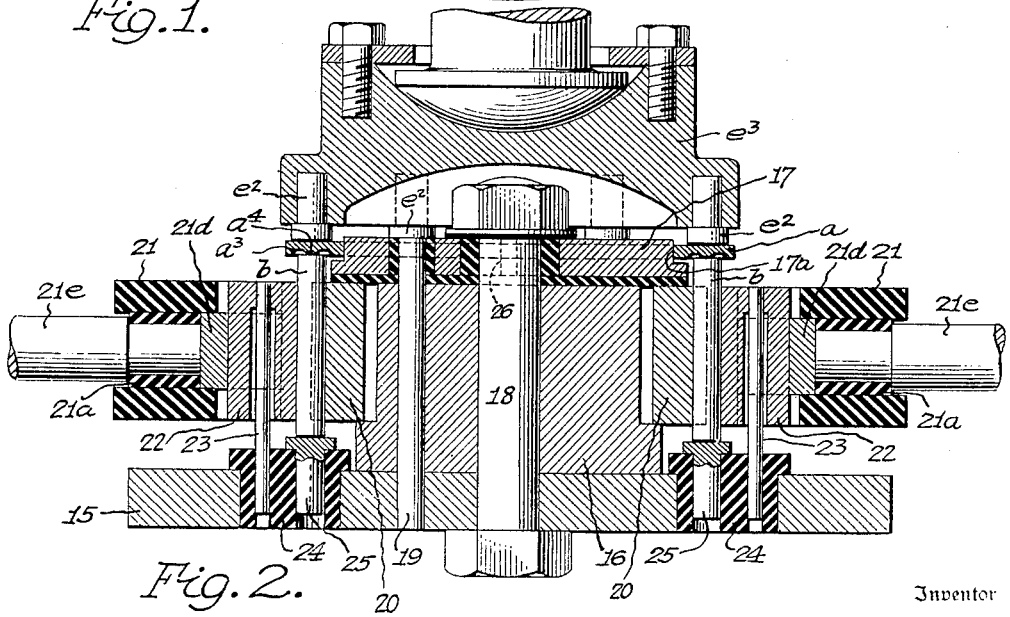
Fig. 2 is a vertical central transverse sectional view of the carrier of Figure 1, the view also showing the movable electrode of the welding apparatus.
Figure 4:
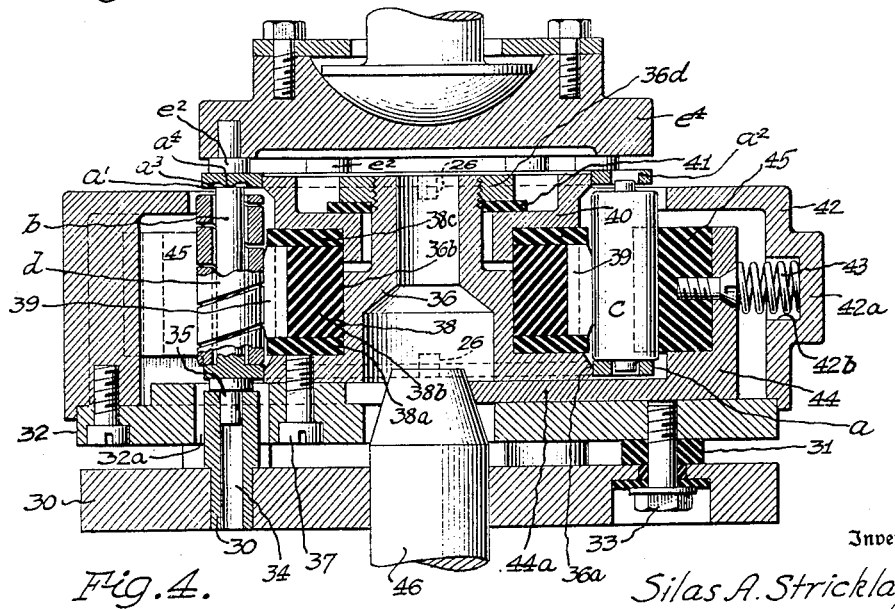
Fig. 4 is a sectional view taken on line 4—4 of Fig. 3, and also showing the movable electrode of the welding apparatus.

As indicated by a comparison of Figures 2 and 4, it is also preferred to change the swivelled head of the upper electrode when changing from one operation to the other, the carrier structure for the second operation having an overall greater height than that for the first operation, so that there is a compensation effect produced by decreasing the vertical dimension of the swivelled head. Such change is not absolutely essential, however, since the head of Figure 2 could also serve for the second operation; it would require greater adjustment of the general mechanism, however, and for this reason it is preferred to make the change indicated. To distinguish the heads, the swivelled head of Figure 2 will be indicated as $e^3$ and that of Figure 4 as $e^4$.

The contacts $e^2$ may be of any suitable conducting material, but I prefer to employ the material known as Elkonite, this material forming a very efficient contact both in operation and in length of service.

Referring first to the carrier for the first operation—shown more particularly in Figures 1 and 2—15 indicates a base plate, preferably of copper, and having openings through which it can be attached to the lower electrode $f$ by suitable means, such as bolts. The plate 15 thus becomes, in effect, a part of the lower electrode and therefore a part of the current path during the welding operation. Supported on the base plate is a central block member 16, also preferably of copper, and which, in turn carries a member 17, having an annular shoulder 17a, adapted to properly center the member $a$ of the assembly, when the parts are in position for welding. Member 17 is insulated from the conducting path by suitable insulation, as shown, and the several parts referred to are united by suitable means such as a bolt 18. Since the members 16 and 17 are not designed to be rotated relative to the base plate, suitable means, such as pins 19, for instance, extend vertically through this group of parts.

The member 16 is provided with a plurality of radial indentations 16a on its periphery, these corresponding in number to the number of posts $b$ in the bearing assembly, and positioned in correspondence to the position of the posts. These indentations or recesses 16a are designed to receive post holding elements 20, of suitable form but preferably having the cross-sectional configuration shown in end view at the right in Figure 1, in which the elements are shown as square or non-circular in contour, with each of the four sides provided with a semi-circular recess 20a, each recess being capable of providing a contact support to a post, when the particular face is in proper position to receive the post. Obviously, the recesses 16a will have a conformation to receive these elements in close fitting arrangement, since the elements 20 are designed as a part of the current path, being what may be considered as an electrical connection by which the individual current path through a post is brought to the common terminal provided by member 16.

Conducting elements 20 are obviously of conducting material such as copper, and the several recesses 20a are designed to increase the life of the connection, since any damage to the recess of one face such as to render that face useless, can be overcome by simply removing the element and returning it to position with a different face as the active face. In this way the cost of material for repairs is retained at a minimum; in addition, it will be understood that until an element has all of its faces useless, there will be no need for taking the time of going to the supply when the operator is required to make the repair.

Figure 5:
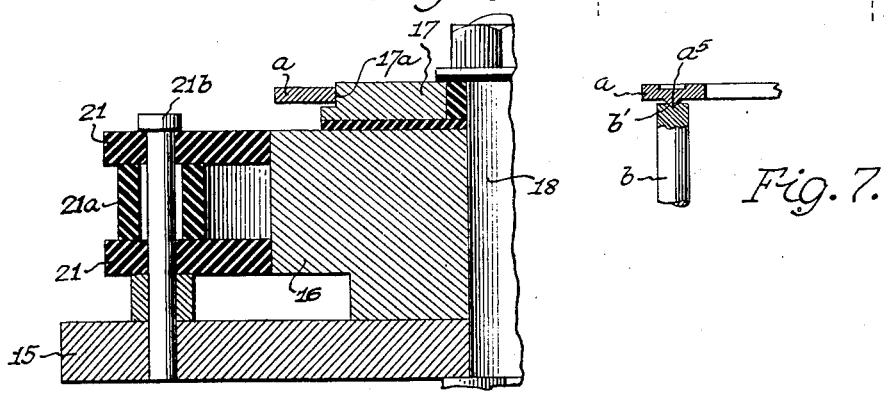
Fig. 5 is a detail sectional view taken on line 5—5 of Figure 1.

21 designates an annular structure, formed mainly of insulating material and which may be formed of three layers as indicated in Figures 2 and 5, the intermediate layer, 21a, being arranged to be shiftable annularly relative to the outer layers, the three layers being secured together as a unit by any suitable means, such, for instance, as members 21b, the layer 21a being provided with elongated slots 21c to permit and yet limit such relative movement. The layer 21a carries a series of cam members 21d, these being so located as to be opposite the positions of the connections 20, being designed to shift the positions, radially, of a series of outer contacting elements 22 which are adapted to contact with the positioned posts and firmly clamp the latter within the recesses 20a. Suitable handles 21e are provided to enable ready oscillation of the layer 21a.

The elements 22 are each supported in suitable manner, a preferred arrangement being by the use of a spring rod 23, anchored in an insulated member 24 carried by the base plate, the upper end of the rod being united to the element in suitable manner. In this way the element 22, also of copper or other low resistance metal, will be kept out of electrical conductivity with the base, and at the same time provide a simple arrangement by which, when the posts have been welded, a simple movement of layer 21a will release the camming action and permit the spring rods to return the elements 22 to an outer or inactive position.

The insulating members 24 also carry post supports 25, of suitable material, these having an upper face on which the inactive end of a post can rest during the welding operation. The supports are preferably insulated in order to prevent electrical conductivity with the base plate from the post excepting through the connections 20 and block 16.

Figure 1:
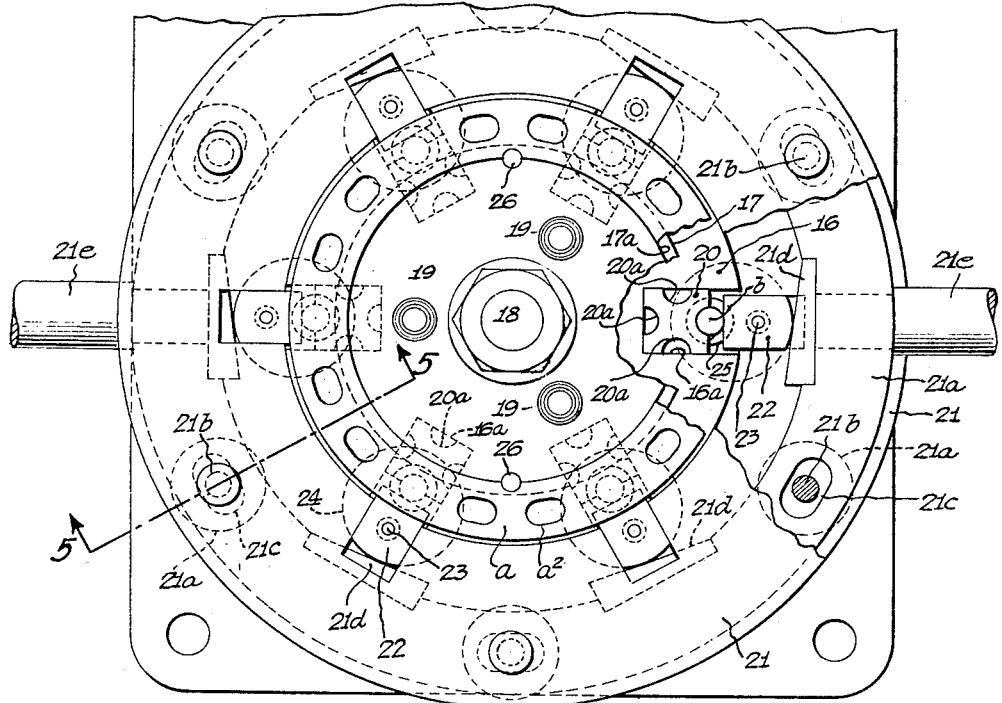
Figure 1 is a top plan view of what may be termed a carrier for the posts and annular member during the first-stage welding operation, the carrier being designed for use with an electric welding apparatus.

As will be understood, when the carrier is to be loaded, the head $e^3$ will be raised, and the handles 21e so positioned as to permit the elements 22 to lie in their outer positions. The posts are then positioned on the supports 25 within the active recesses 20a, after which the member $a$ may be positioned relative to guide member 17—being properly located to place its localized welding points in proper relative position to the posts by the use of suitable means such, for instance, as pins 26, carried by member 17, and adapted to cooperate with suitable recesses on the inner periphery of member $a$ as shown in Figure 1. By lowering the upper electrode to bring the contacts $e^2$ into contact with the upper face of member $a$, and then shifting handles 21e to produce the camming action concurrently on all of the elements 22, the posts will be properly clamped in position and the member $a$ properly positioned, with the current connections all completed in such form as to set up a current path in multiple or parallel between the swivelled head $e^3$ and the central block member 16, each of the parallel paths passing through a contact $e^2$, member $a$, the post $b$, and connections 20, the path then continuing through the base plate to the lower electrode. Obviously, the posts can be clamped in position prior to lowering of the upper electrode, if desired. When the parts are thus positioned, the circuit is closed on to the electrodes for a slight period, thus energizing the localized path through the projections $a^4$ and the end of the post, and producing the "flash" which completes the welding. The upper electrode is then raised, and the handles 21e manipulated to release the elements 22, thus freeing the posts from clamping action and permitting the embryo cage structure shown in Figure 8 to be removed bodily from the apparatus to permit the development of a succeeding operation.

As will be understood, the arrangement of the carrier is such that ample conductivity conditions are provided at all points excepting at the specific localized points at which the welds are to be made. Consequently, there will be no undue heating of the apparatus in operation. While other parts are in contact with the live path, and thus do not check the proper development of the completed circuit rapidly, these parts are all so arranged as to prevent the development of any other electrical path to the base member or block 16, the particular arrangement by which the annular clamping element 21 is supported being indicated in Figure 5. Consequently, the positioning and welding of the posts relative to member $a$ can be provided expeditiously and with an assurance of proper welding conditions for each of the welding points, and at the same time the time required for the current application is so short, that the temperature of the member $a$ and the posts is not materially raised excepting at the localized welding points.

Figure 3:
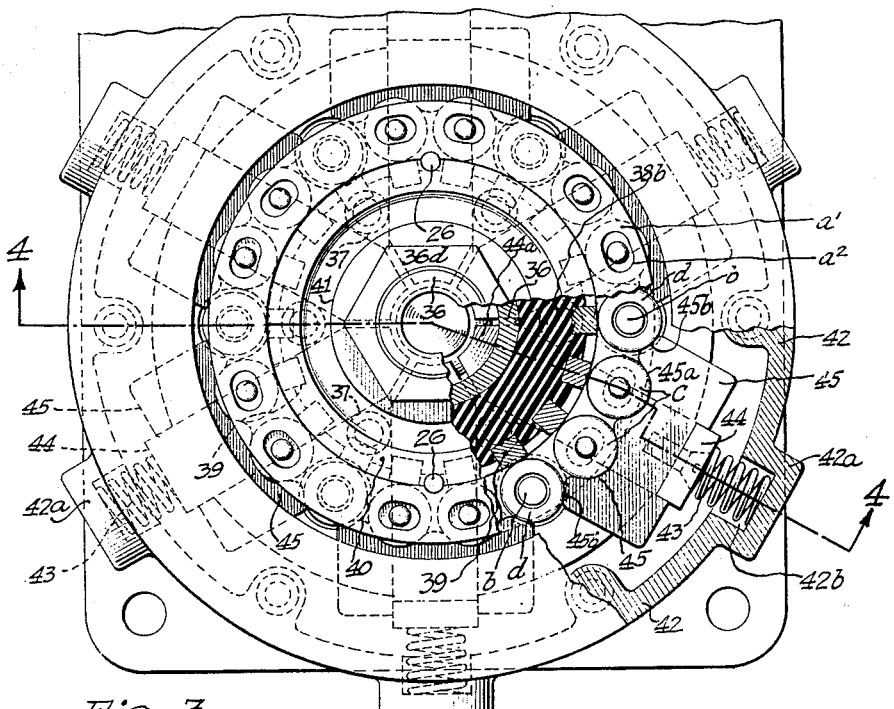
Fig. 3 is a top plan view of a second carrier employed during the second-stage welding operation, parts being broken away for clearness.

When it is desired to arrange the apparatus for the second welding operation, the carrier of Figures 1 and 2 is removed from the lower electrode, together with the swivelled head $e^3$—where the change is to include the substitution of the latter—and the carrier and head of Figures 3 and 4 is substituted, the base plate 30 being secured in the position previously occupied by base plate 15.

Before taking up the details of the latter carrier, a brief explanation is made of some of the conditions to be met.

As pointed out above, the bearing assembly used for illustration utilizes the posts $b$ as supports for the spiral rolls, the result being that when the assembly is made, the presence of these rolls act to prevent the completing of the conducting path through a central block such as 16, since it is desired to prevent the spiral rolls from forming a part of the path. Hence, the conducting path must be established in a different way. In addition, it is necessary that the spiral rolls be kept out of contact with the posts; the spacing between a post and its roll is small, and therefore assurance must be had that the current path be provided in such way as to not affect these rolls. The solid rolls must also be in position, and this brings up the condition of preventing a path between the two members $a$ and $a'$ excepting through the posts, a condition which requires that rolls $c$ be carefully positioned.

In meeting these conditions, one advantage is had by reason of the accuracy of the first welding operation, through its assurance that the posts are not only properly located as to position annularly, but have been positively held so that assurance is had that their free ends will be in proper position relative to member $a'$ when the latter is placed in position. Since the posts are now secured to the member $a$ by the first welding operation, there is no particular need for clamping the posts during the second operation, so that the adjusting and securing structures can be more particularly employed in connection with the rolls.

Secured to base plate 30, and spaced therefrom by insulating members 31, is a plate 32 which forms the support for the parts superposed thereon, the two plates being secured together by suitable means such as screws 33, these being insulated from plate 30, the latter, as with plate 15, forming part of the current path due to its contact with the lower electrode. The plate 32 is provided with a series of openings 32a, positioned in correspondence with the positions of the posts b in the assembly, these openings being designed to permit of the passage of posts 34 secured to base plate 30, these posts being of copper or other conducting material, and being made hollow to receive the ends of the contact members 35, which are similar to the contact member $e^2$ heretofore described, and are designed to provide a similar service when the embryo cage structure is positioned.

Mounted on plate 32 is a hollow standard 36 of a peripherally-stepped formation, with each step of annular contour, the standard and plate being connected by suitable means such as screws 37. The lower step of the standard has a diameter such as substantially corresponds with the inner diameter of member a, and in the apparatus, serves as the centering means for the embryo structure of Figure 8, member a of the latter having its outer face resting on the several contacts 35 and outside of the lower step 36a, the posts b extending vertically.

The second step 36b of the standard provides a support for a portion of an annular composite insulation structure 38, formed, for ready manufacture, of members 38a, 38b and 38c, portion 38a resting on the lower step, while portion 38b lies partially outside of step 36b and another member presently described, while the third portion 38c lies outside of this latter member. This arrangement of the portions permits of a ready slotting of the periphery of portion 38b to receive metallic members 39 which are held from endwise movement by the portions 36a and 36c. The members 39 serve as positioning supports for the spiral and solid rolls of the assembly during welding.

The interior structure is completed by the member 40, also of peripherally-stepped arrangement, the upper and larger step being designed for centering the ring a', a second step formation resting upon portion 36c and lying inside this portion and portion 36b, the member 40 being the member referred to above. Step 36a and the larger step of member 40 preferably carry positioning pins 26 as in Figure 1, these being preferably vertically alined.

These parts are firmly united in clamped relation by a nut 36d mounted on the reduced upper end of standard 36, and being insulated from member 40 by an insulation collar 41. As will be understood, this particular arrangement provides for ready assembly of this unit as well as repairs, removal of nut 36d releasing member 40 and the insulation structure 38 to permit of such changes, etc., as may be desired.

Plate 32 also carries an external annular structure 42 projecting upwardly opposite the roller zone of the carrier, the structure 42 being secured to plate 32 by suitable means such as screws. Structure 42 is provided with a plurality of outwardly extending projecting portions 42a, to permit of the formation of suitable recesses 42b on the inner face of the structure. These recesses are preferably located approximately on a line corresponding to a radius of member a extending between the solid rolls, although it will be understood that the recesses may be otherwise located. The recesses are designed to receive the outer portions of springs 43, and the location referred to permits a spring to be located approximately midway of the length of a clamping and positioning element 44 of composite formation, and which includes a laterally extending portion 44a which extends radially inward beneath the standard 36, being located in radial slideways formed in plate 32.

The element 44 carries an insulating block 45, the inner face of which carries recesses 45a for the solid rolls of a segment of the assembly, and also arcuate portions 45b which are designed to co-operate with the two spiral rolls at opposite sides of the two solid rolls. Springs 43 lie between the structure 42 and the element 44, and when the rolls are placed in the apparatus and element 44 released from restraint, said springs will move the elements inward to properly position the rolls and to clamp them against the opposite members 39. It will be understood that during the welding operation no specific action takes place on the rolls so that there is no necessity for employing a heavy clamping pressure; in addition, the rolls themselves are in their finished form and it is undesirable to subject them to any action which might disturb such finished condition. Hence, the spring clamping pressure will be sufficient to force the rolls to their proper positions for the welding operation and to retain them in such position.

Since the several laterally-extending portions 44a extend radially toward the center of the carrier, the inner ends of these are shaped with wedge-shaped ends, the end surface being arranged arcuate so as to co-operate with a member 46 which extends vertically through plates 30 and 32 into the interior of the standard 36. The upper end zone of member 46 is more or less conical in form, this zone being designed to act in the nature of a cam relative to members 44 by vertical movement of the member 46; when the member is raised, members 44 will all be moved outward against the spring pressure, thus freeing the roll structure which may be present; when member 46 is moved downwardly, members 44 are moved inwardly by the action of the springs 43 to clamp the rolls for the succeeding operation.

When it is desired to load the carrier, the head $e^4$ is in raised position, and member 46 is retaining members 44 in their outer positions. The embryo assembly of Figure 8 is then placed in position with the outer face of member a resting on the contacts 35 and surrounding step 36a. The rolls are then placed in position—the spiral rolls on the upstanding posts b and the intermediate solid rolls with their pintles in the slots of member a, the lower ends of each of the rolls resting on the inner face of member a. Member 46 is then moved downwardly to permit the positioning elements to properly locate the rolls—two adjacent members 45 co-operating with each spiral roll through the arcuate faces 45b—and to clamp the rolls in such position. The member a' is then positioned on the free ends of the posts b, being centered by step 45a, after which the head $e^4$ is lowered to its operating position thus clamping the parts ready for the welding operation. The current is applied briefly to provide the flash action, after which the head is raised, and member 46 moved upwardly to release the rolls, thus leaving the completed bearing assembly free to be removed.

During the current application, the paths in parallel between head $e^4$ and plate 30 each extend through contact $e^2$, member $a'$ and projection $a^3$, to the end of the post; along the post to the member $a$, contact 35 and post 32a. As contacts $e^2$ and 35 are directly opposite each other, it can be understood that the arrangement provides for a localized path through both rings, in alinement with the posts, and with the welding zone isolated to the center zone of the upper end of each post. While there are other parts in contact with some of the parts, such contact is not active as a part of any path, so that the current paths are limited to those referred to.

As pointed out, the welding activity is restricted to the ends of the posts and the opposing configurations of the members $a$ and $a'$. In the completed assembly these portions are hidden, and hence there is no detraction in the appearance provided by the welding operations with the result that all parts of the bearing assembly can be finished in advance. In addition, the posts are unaffected by the welding operations so that the freedom of operation of the spiral rolls is the same after the welding operations as would be the case were the cage structure of the riveted type, although the securing of the posts is on the inner face of the member, thus contrasting with the riveting type where the action is on the outer face of the member. Since the cage connections are of the welded type, it will be readily understood that when the assembly is completed, the bearing is exceedingly strong, since the welds provide the strength and rigidity which comes from the unitary structure thus provided, differing in this respect from the riveted type where it is necessary that the posts extend into riveting position relative to the annular members, so that there is always the possibility of looseness.

The result is made manifest through the ability to provide an assembly of the parts forming the embryo cage structure in such manner that these can be located relative to an inactive welding circuit in such relation that the circuit operates in parallel through the zones to be welded, with the latter provided by the cooperative arrangement of member $a$ and the ends of the posts, so that the initial current path within the welding zone is restricted to a central zone of the end of the post with the latter zone of small area. Consequently, the parts rapidly reach the welding condition, and the metal does not pass outwardly and onto the exposed portion of the post which is within the zone of activity of the spiral roll. The flash produced remains outside of the active zone of the roll, so that the post is unaffected by the welding operation. The weld produced renders the embryo structure practically a unitary formation in which the parts have their proper positions, so that the embryo structure can then serve as the positioning element for the second operation, it being necessary only to properly center the member $a$, thus placing the posts in proper position to coact with the member $a'$ during the second operation, the latter member being also properly centered. Members $a$ and $a'$ being duplicates, it will be understood that if the posts are properly located with respect to one member, they will be in proper position to coact with the other member when both members are properly centered.

As will be understood, the invention provides a new and improved method of producing roller bearing unit structures, by substituting the welding activities for those of riveting, thus providing for a better bearing assembly, as well as for more efficient production. To permit such substitution, however, it has been necessary to develop novel methods of producing the welding circuits, etc., due to the inherent difficulties brought about by the characteristics of the parts to be welded and the parts required to be employed in the complete assembly, and to the need for accuracy, since the very nature of a bearing unit assembly is such as to necessitate accuracy in production in order that the assembly in service will operate with maximum efficiency.

The success of the substitution as a possibility rests mainly on the development of the contact between post and member, such for example as illustrated in Figures 6 and 7. As will be seen from Figures 2 and 4, the contacts $e^2$ on one side of the member and the end of the post on the other side, present areas for a conducting path of considerable area through the member $a$ or $a'$; this would constitute the current path during the usual welding operations, but it would be a path which included the entire end surface of the post as a part of the actual contact area, so that welding would tend to affect the end zone of the post, and thus affect the exposed surface of the latter as well as possibly varying the post length. By the arrangement shown, however, the current path is initially limited to an area considerably less than the area of the post end, so that as the welding action develops the action is limited to the end face, thus ensuring the constancy of post length as well as the integrity of the peripheral surface of the post itself. The difficulty in this respect is increased by the fact that the post itself is of small diameter, so that it necessitates the development of a very small contact area as the initial active area, and at the same time provide an efficient contact such as to ensure the development of the proper welding action. Because of the conditions, the current activity required is of very short duration, since the current flow is suddenly restricted to this small area and thus quickly developing the welding conditions.

It is obvious, of course, that where the bearing unit assembly differs in the arrangement of rolls, the structural arrangement of rolls, the structural arrangement of the carriers would be modified accordingly, the general characteristics disclosed herein being maintained, however, since these would be applicable to most, if not all, of the different types of such assemblies.

While the disclosure presents the elements 45 as designed to co-operate with a plurality of rolls, it can be readily understood that such arrangement can be varied so as to include a greater or less number of rolls, even to the point where each has an individual element; however, it has been found that the arrangement of Figures 3 and 4 operates efficiently, and since it is simple and readily serviced for repairs, etc., such arrangement is preferred where the conditions are as in the illustrated form. Obviously, the element may be supported by more than a single spring 43, if desired.

While I have herein shown and described one or more ways in which the broad characteristics of the invention may be carried out and the methods performed, it will be readily understood that changes or modifications therein may be found necessary or desirable to meet the various exigencies of use to which the invention may be applied, and I desire it to be understood that I reserve the right to make any and all such changes or modifications as may be found necessary or desirable, insofar as the same may fall within the broad spirit and scope of the invention as expressed in the accompanying claims when broadly construed.

Having thus described my invention, what I claim as new is:—

1. In the art of producing roller bearing unit assemblies wherein the rolls are supported by a cage formed of a pair of annular members and posts connecting said members, a step in the method of producing the assembly which consists in producing an embryo cage structure by positioning one of the annular members and the posts in predetermined arrangement of these parts with the ends of the posts in contact with and opposing the inner face of the member within a restricted area of the post end and with the assembled parts located relative to an inactive welding circuit to include the posts and localized portions of the member as paths in parallel in such circuit, and completing the embryo formation by rendering the welding circuit active for a time length such as to flash a localized zone of member and post end and weld the posts to the inner face of the member solely at such end of the posts, whereby the welded structure will present the flash of the weld as located wholly beyond the post end to permit roll location and free movement of the rolls in the complete cage assembly.

2. In the art of producing roller bearing unit assemblies wherein the rolls are supported by a cage formed of a pair of annular members and posts connecting said members, a step in the method of producing the assembly which consists in assembling an embryo cage structure and the bearing rolls, with the embryo cage structure formed of an annular member and posts secured thereto to project upwardly therefrom, the rolls being supported at one end by the member of the embryo cage structure, positioning a second annular member in contact with a restricted area of the end faces of the free ends of the posts, and locating the assemblage relative to an inactive welding circuit in which the posts and localized zones of both annular members form individual current paths in parallel relation within the circuit, and completing the bearing assembly by rendering the welding circuit active for a time length such as to flash a localized zone of member and post end and weld the posts to the inner face of the added member solely at such end of the posts, whereby the welded structure will present the flash of the weld as located wholly beyond the post end to permit free movement of the rolls in the completed cage assembly.

3. A method as in claim 2 characterized in that the bearing assembly includes tubular rolls carried by the posts, and that the assembly of the embryo cage structure and rolls includes the positioning of the hollow rolls on the posts with the rolls maintained out of contact with the body of the post but resting on the annular member of the embryo cage structure.

4. In the art of producing roller bearing unit assemblies wherein the rolls are supported by a cage formed of a pair of annular members and posts connecting said members, the method of producing the assembly which consists in first producing an embryo cage structure formed of the posts and one of the end members by concurrently welding an end of the posts to the inner face of the member; then positioning the rolls relative to the annular member of the embryo cage structure; and finally completing the bearing assembly by concurrently welding the free ends of the posts of the embryo structure to the inner face of the second annular member, the welding areas of the members being isolated to accord with the positions of the posts and including restricted areas of the post ends to thereby prevent welding of the rolls to either of the members during the second welding operation, the posts each forming a part of the welding circuit in each welding operation.

5. A method as in claim 4 characterized in that the welding circuit in each welding operation includes current paths in parallel, with the number of paths equal to the number of posts of the embryo cage structure with the annular member included in each circuit in each welding operation.

6. A method as in claim 4, characterized in that the rolls include tubular rolls with these rolls located on the respective posts and maintained out of contact with the body of the post and second member during the second welding operation.

SILAS A. STRICKLAND.